United States Patent [19]
Waldman

[11] Patent Number: 5,131,031
[45] Date of Patent: Jul. 14, 1992

[54] HOLD CIRCUITS FOR TELEPHONE SYSTEMS

[76] Inventor: Herbert Waldman, 1739 52nd St., Brooklyn, N.Y. 11204

[21] Appl. No.: 397,971

[22] Filed: Aug. 24, 1989

[51] Int. Cl.$^5$ .............................................. H04M 1/05
[52] U.S. Cl. .................................. 379/393; 379/162; 379/372
[58] Field of Search .............. 379/162, 163, 215, 372, 379/393

[56] References Cited

U.S. PATENT DOCUMENTS

| | | | |
|---|---|---|---|
| 4,011,413 | 3/1977 | Phillips | 379/393 X |
| 4,093,829 | 6/1978 | Silberman | 379/393 X |
| 4,311,880 | 1/1982 | Balzer et al. | 379/162 |
| 4,419,543 | 12/1983 | Kelm et al. | 379/393 X |
| 4,551,582 | 11/1985 | Matsuo | 379/393 |
| 4,656,660 | 4/1987 | Nishimura et al. | 379/393 |
| 4,674,118 | 6/1987 | Tosto | 379/393 |
| 4,803,718 | 2/1989 | Neil et al. | 379/393 X |
| 4,841,566 | 6/1989 | Lott | 379/393 X |
| 4,899,381 | 2/1990 | Lee | 379/393 |

FOREIGN PATENT DOCUMENTS

| | | | |
|---|---|---|---|
| 0250763 | 12/1985 | Japan | 379/393 |
| 0257643 | 12/1985 | Japan | 379/393 |
| 0245752 | 11/1986 | Japan | 379/393 |
| 0299640 | 12/1988 | Japan | 379/393 |

*Primary Examiner*—James L. Dwyer
*Assistant Examiner*—Magdy W. Shehata

[57] ABSTRACT

Modular hold circuits which may be independently connected to a telephone line and powered therefrom are provided in accordance with the teachings of the present invention. Hold circuits connectable to a telephone line in the same manner as a telephone instrument are employed to detect an actuating signal generated at any telephone instrument in an off-hook condition connected to that telephone line. Upon detection of such actuating signal, an impedance is placed across the telphone line to establish a hold condition. The hold condition established may be released by placing any telephone instrument connected to a telephone line in an off-hook condition, however, if the telephone line is provided with a "call waiting" feature, such off-hook condition must be maintained for an interval exceeding that associated with a "call waiting" signal for the hold condition to be released.

48 Claims, 1 Drawing Sheet

HOLD CIRCUITS FOR TELEPHONE SYSTEMS

BACKGROUND OF THE INVENTION

This invention relates to hold circuits for establishing and releasing a hold condition on a telephone line and, more particularly, to improved modular hold circuits which may be independently connected to a telephone line, accessed and released from any telephone instrument connected to that telephone line and operable to maintain an enabled hold condition despite the application to that telephone line of a "call waiting signal".

In my U.S. Pat. No. 4,243,844, as issued on Jan. 6, 1981, and reissued as Re. 31,643 dated Aug. 1984 there are disclosed hold circuits for telephone systems which are highly convenient in that the same are operable with either rotary or DTMF telephone systems and are connectable to a telephone line through the same form of jack employed for conventional telephone instruments. The hold circuits there disclosed are operable within a telephone system having one or more telephone instruments connected thereto and only a single hold circuit module need be employed per telephone line. The hold circuit module may be selectively enabled and released from any telephone instrument connected to the line without, in preferred embodiments, any direct association to a given telephone instrument other than that achieved by connection to the common telephone line.

Thus, rather than requiring the separate provision of a hold button or the like at each telephone instrument, preferred embodiments of the hold circuit there disclosed may be selectively enabled from any telephone instrument connected to the line by the depression of a designated button at a DTMF pad at a telephone instrument connected to the line and subsequently released merely by lifting the handset at any telephone instrument connected to the line. In addition, the hold circuit may be engaged when the handset is in an off-hook condition without disabling the communicating function of the handset and the hold condition is retained when the handset is returned to the telephone instrument to establish an on-hook condition. The hold condition is removed upon subsequent removal of the handset from the telephone instrument to establish an off-hook condition, and the accessing and release of the hold circuit may occur at different telephone instruments connected to the same telephone line.

The hold circuits described are thus highly line of a telephone system merely through the connection of a hold circuit module to the line. Furthermore, complex installation is avoided while use of the hold circuit is quite straightforward and user friendly.

The attributes of ease of installation, as well as the creation of a friendly interface between the user and the instrument, are especially important due to the manifest changes which are occurring in the nature of telephone systems presently being created in homes and small business locations. More particularly, the wide proliferation of systems where the user purchases telephone instruments and related on-site equipment from suppliers other than the telephone company, has created a discernible trend to a market where the user, in effect, creates his own system and merely attaches the same to jacks provided by the telephone company. This trend thus mandates on-site telephone equipment which avoids the separate wiring and other installation difficulties once conveniently handled by installation technicians dispatched by the telephone company, as well as user manuals similarly provided. Furthermore, it is important that such devices be compatible with other devices already installed by a user who might not have envisioned a need for a hold circuit capability when the initial telephone instruments for the system were purchased.

While the hold circuits described in U.S. Pat. Re. 31,643 provide a highly effective solution to these needs, the recent introduction of a new form of service by the telephone company has somewhat reduced the total flexibility of the circuits employed and, in effect, have imposed a system limitation in that the same are not fully operable where a form of service known as "call waiting" is present. More particularly, the hold circuits disclosed in U.S. Pat. No. 4,243,844 rely upon a detection of a predetermined signal to enable the hold condition and a shift in voltage on the telephone line between an on-hook and off-hook condition to cause a release of a hold condition previously established.

Thus, for instance, when a telephone instrument is in an on-hook condition, the voltage between tip and ring on the telephone line will ideally be approximately 50 volts, although marked variations due to conditions on the line and distances from the central office are encountered. Conversely, when a telephone handset is in an off-hook condition, the voltage on the telephone line will typically assume a state of from 5 to 12 volts, and it is this marked change in voltage which is relied upon to cause a release of the hold condition previously established. However, in a system which provides call waiting, a click having a duration of approximately 200 milliseconds is provided at the handset to indicate to a user that an incoming call is present. This click, if supplied on a telephone line on which a hold condition has been imposed, will tend to drive the voltage level on the line to 0 volts so that the same may be interpreted by the hold circuit as an off-hook condition at a telephone instrument employed to release the line. Hence, under these circumstances, the line being held would be released and since all the telephone instruments for that line are in an on-hook condition, the call being held would be lost.

In addition, in preferred embodiments of the invention disclosed in U.S. Pat. No. 4,243,844, phase-locked loops were employed to ascertain the to signal the hold function from a telephone instrument in an off-hook condition. While such devices as phase-locked loops are highly precise and perform the frequency detection function with a high degree of accuracy, such devices require a separate power supply. This adds installation complexity which, while insubstantial, are preferably avoided.

Therefore, it is an object of the present invention to provide improved hold circuits for telephone systems.

A further object of this invention is to provide hold circuits for establishing and releasing a hold condition on a telephone line operable to maintain an enabled hold condition despite an application to that telephone line of a transitory signal condition.

An additional advantage realized by virtue of the circuit design of the instant invention is the elimination of false release of the Hold condition due to a condition known as "contact bounce" Contact bounce is a phenomenon that may occur when one restores the telephone handset onto the telephone cradle effecting the telephone hook-switch or cradle switch contacts closure. If the handset restoration is done somewhat abruptly, the contacts tend to bounce, that is they tend to close and open several times successively before settling down to a permanent closure mode. This process of contact bounce, will apply a transitory release signal condition to the telephone line, causing the release of a Hold condition in Typical Hold circuitry.

Accordingly, it is a further object of the instant invention to eliminate false Hold condition release caused by contact bounce of the telephone Hook-switch contacts and to provide Hold Release circuitry which is immune to any transitory release signals applied to the telephone line.

An additional object of this invention is to provide hold circuits which may be powered solely by voltage levels present on the telephone line.

Another object of this invention is to provide hold circuits operable to maintain a hold condition during and subsequent to the application to the telephone line of a "call waiting signal".

SUMMARY OF THE INVENTION

In accordance with the teachings of the present invention, modular hold circuits which may be independently connected to a telephone line are provided wherein elements capable of being powered directly from a telephone line are employed to detect an actuating signal generated at any telephone instrument in an off-hook condition connected to that telephone line and upon detection of such actuating signal an impedance is placed across the telephone line to establish a hold condition the hold condition established may be released by placing any telephone instrument connected to a telephone line in an off-hook condition, however, if the telephone line is provided with a "call waiting" feature, such off-hook condition must be maintained for an interval exceeding that associated with a "call waiting" signal.

BRIEF DESCRIPTION OF THE DRAWING

The invention will be more clearly understood by reference to the following detailed description of an exemplary embodiment thereof in connection with the accompanying drawing in which.

DETAILED DESCRIPTION

Figure 1:
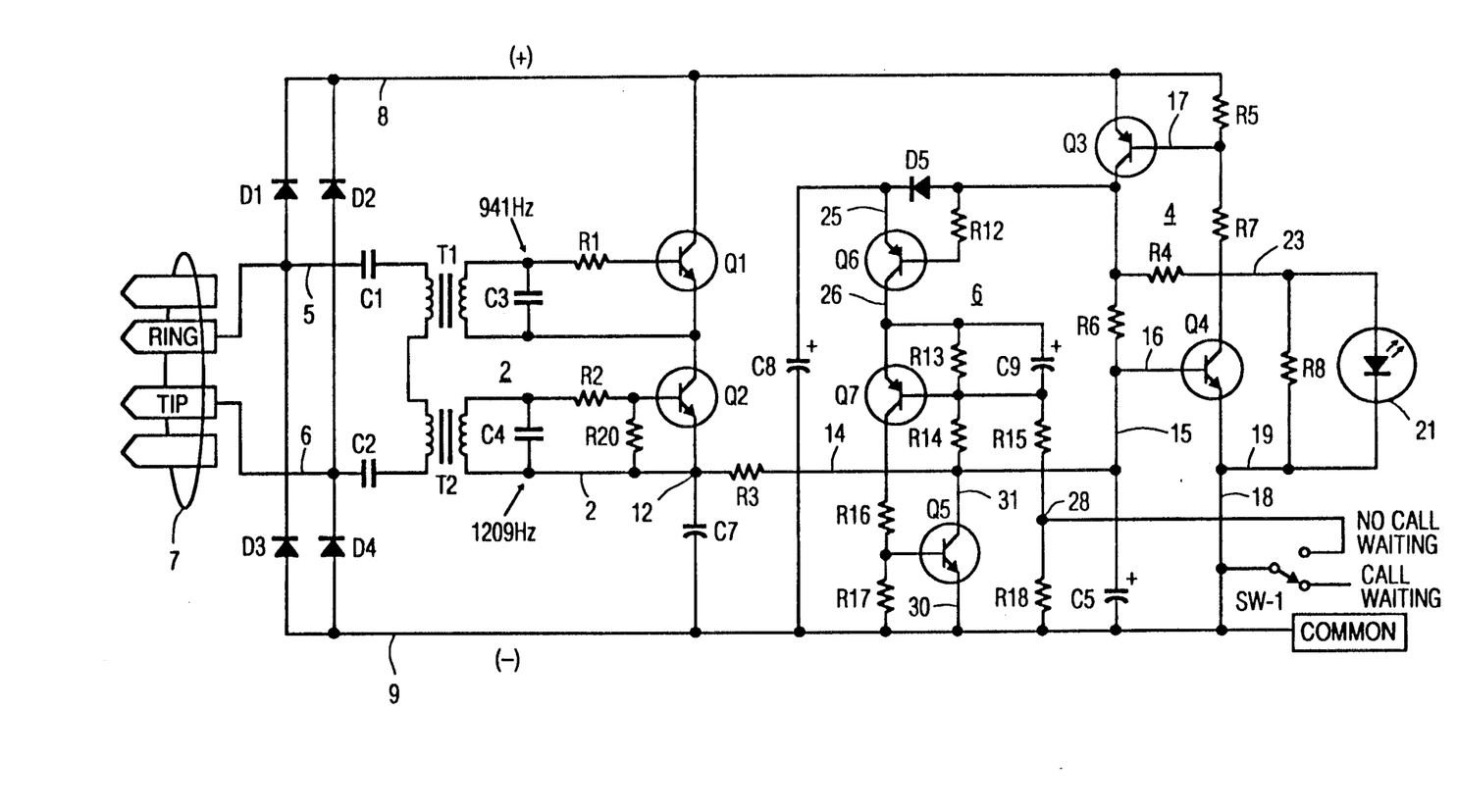
The figure is a schematic diagram illustrating a preferred, exemplary embodiment of improved hold circuits for telephone systems according to the teachings of the present invention.

Referring now to the figure, there is shown a schematic diagram serving to illustrate a preferred, exemplary embodiment of improved hold circuits for telephone systems according to the present invention. The preferred embodiment of the invention illustrated in FIG. 1 is configured as a universal device operable in an optimized mode with telephone systems having a call waiting feature, as well as those which are not provided with such service; however, it will be apparent to those of ordinary skill in the art as this disclosure proceeds that dedicated forms of devices may be provided, if desirable, for each form of service.

Referring specifically to the figure, there is shown an improved hold circuit for telephone systems, according to the present invention, which includes a hold signal detection circuit indicated generally at 2, hold latch circuit means 4 and disconnect latch means 6. The hold signal detect circuit 2 comprises a pair of filter capacitors C1 and C2, a pair of pot cores T1 and T2, capacitors C3 and C4, resistors R1 and R2 and the transistors Q1 and Q2.

The filter capacitors C1 and C2 may take any of the conventional forms of this well-known class of device and act simply to filter the telephone line voltage applied to the hold circuit illustrated in the figure. As such, filter capacitors C1 and C2 may have typical values of 0.022 $\mu$f, exhibit 500 volt ratings and be configured as disks or the like. Each of the filter capacitors C1 and C2 are connected through conductors 5 and 6 to the telephone line as indicated by the connector 7. The connector 7 may, as indicated, take the conventional form of a standard RJ11C connector wherein the central two terminals thereof are connected to the conductors 5 and 6 and to the ring and tip connections of the telephone line through which service is being provided. The outer two terminals of connector 7 are unconnected. In addition to being connected to the input sides of the filter capacitors C1 and C2, the ring and tip terminals for the telephone line are connected through diodes D1-D4 to the conductors 8 and 9 wherein conductor 8 forms the positive side of the circuit while conductor 9, as indicated, forms the negative side or common for the circuit provided.

The diodes D1-D4 are connected in a bridge ordinary skill in the art, so that regardless of the polarity of the voltage applied to the ring and tip terminals of the connector 7, a plus voltage will always reside on the conductor 8 while a negative voltage will be present on conductor 9. The diodes D1-D4 should, as will be readily appreciated by those of ordinary skill in the art, exhibit 300 volt ratings and may typically take the form of 1N403 diodes such as readily available from International Rectifier Corporation or the like. In this regard, it should be noted that the diodes D1-D4 should exhibit at a minimum, 200 volt peak-to-peak ratings as the voltage applied to the ring and tip terminals of the connector 7 will range, under optimum conditions, from approximately 48 volts when telephone instruments additionally connected to the telephone line are in an on-hook condition, and from approximately 5 to 12 volts when such telephone instruments are in an off-hook condition.

Those of ordinary skill in the art will also recognize that the voltage associated with an on-hook condition will vary as a function of such factors as the actual ring and tip voltage provided to the telephone line by the central office from time to time, attenuation characteristics associated with the exchange, the given telephone line involved and the distance of the site at which the telephone line from the central office is connected. Furthermore, those of ordinary skill in the art will recognize that the connector 7, when involved in a typical installation, will be plugged into a standard RJ11C jack in precisely the same manner in which telephone instruments are connected within the home or office. Additionally, should an additional RJ11C jack not be available at The site, a two-for-one adapter may be inserted into the jack assembly at the home or business site whereupon the conventional telephone instrument would be plugged into one outlet of such two-for-one adapter while the hold circuit illustrated in the figure would be plugged into the other jack. Thus, minimal installation requirements are present.

The filter capacitors C1 and C2 are also connected, as readily indicated in the figure, to the primary sides of a pair of pot cores T1 and T2. The pot cores T1 and T2 may take the conventional form of 500 mh devices well known to those of ordinary skill in the art and are here selected for purposes of the creation of a tuned circuit since the same exhibit the manifest advantage that no current is drawn thereby when the same are in a standby condition. The primary sides of the pot cores T1 and T2 are connected in series, while the secondaries thereof are each connected in parallel with capacitors C3 and C4 to form a pair of tuned circuit tuned to the frequency of the hold circuit actuating signal.

More particularly, while the actuating signals for the embodiment of the instant invention here being described could be provided by a separate tone generator at each telephone instrument connected to the line, or a portable signal generator could be provided to users of the system for actuation of the circuit it is preferable that the instant invention simply be actuated by signalling means already present at the telephone instruments used within the system. Thus, in a rotary embodiment, hook flashing through use of the cradle switch or the dial might be employed, while in DTMF embodiments, depression of a selected button on the DTMF pad may be employed.

In the instant embodiment, it is assumed that DTMF telephone instruments are connected to the telephone line in which the instant invention is being employed, and for this reason, the hold signal detect circuit 2 will respond to the depression of a single button on the DTMF pad. Those of ordinary skill in the art will readily appreciate that alternatively, hook flash detection techniques such as those disclosed in my U.S. Pat. No. 4,243,844, as described aforesaid, may be used as well.

For purposes of describing the instant invention, it shall be further assumed that the star button on a standard 3 by 4 DTMF pad is employed for purposes of actuating the hold circuit illustrated in the figure. For this reason, the A1 column frequency of 1209 Hz and the B4 row frequency of 941 Hz must be detected by the hold signal detect circuit 2. However, it will be readily appreciated by those of ordinary skill in the art that any of the buttons on a conventional DTMF pad may be employed to generate the actuating signal, and hence, any pair of column frequencies A1-A3 or row frequencies B1-B4 may be employed as well.

Under the conditions assumed, the tuned circuit formed by the pot core T1 and the capacitor C3 is tuned for the row frequency of 941 Hz, as indicated in the figure, while the tuned circuit formed by the pot core T2 and the capacitor C4 is tuned for the column frequency of 1209 Hz, as also indicated. For the values assumed, capacitor C3 may preferably have a value of 0.05 $\mu f$, while the capacitor C4 should have a value of 0.027 $\mu f$. Thus, those of ordinary skill in the art will recognize that the tuned circuit formed by the pot core T1 and the capacitor C3 will provide a well-defined output spike when the DTMF frequency of 941 Hz is applied to the telephone line by a connected telephone instrument in the off-hook condition. A corresponding spike will be output from the tuned circuit formed by the pot core T2 and the capacitor C4 when a 1209 Hz signal is present on the telephone line. Thus, when the star key on a DTMF telephone instrument in the off-hook condition is depressed, both the tuned circuits formed by the pot core T1 and the capacitor C3 and the pot core T2 and the capacitor C4 will provide a well-defined spike at the outputs thereof.

Those of ordinary skill in the art will appreciate that while the tuned circuits formed with pot cores T1 and T2 could be replaced by other forms of detecting networks such as the phase-locked loops described in U.S. Pat. No. 4,243,844, use of the pot cores T1 and T2 provide a distinct advantage in that the same obviate a need for a separate power supply. The output of the tuned circuit formed by the pot core T1 and the capacitor C3 is connected through a resistor R1 to the base of the transistor Q1, while the output of the tuned circuit formed by the pot core T2 and the capacitor C4 is connected through the resistor R2 to the base of the transistor Q2.

Transistors Q1 and Q2 may each take the conventional form of NPN devices well known to those of ordinary skill in the art and should manifest a voltage rating of at least 250 volts. Exemplary transistors which may serve in the capacity of transistors Q1 and Q2 are 2NA92 devices such as are readily available from National Semiconductor. The resistors R1 and R2 are employed as conventional biasing resistors for the transistors Q1 and Q2, and in this regard, the resistor R1 may have a value of approximately 100 K ohms while the resistor R2 may have a value in the range of 220 K ohms.

Additionally, a resistor R20 is connected between the base of the transistor Q2 and the junction of the capacitor C4 and the secondary of the pot core T2. The purpose of the resistor R20 is to reduce the sensitivity of the transistor Q2, and hence, for the exemplary value of the resistor R2 specified above, the resistor R20 may have a value of approximately 100 K ohms. The sensitivity of the transistor Q2 is optional, and alternatively, the same biasing configuration employed for the transistor Q1 may be employed. However, it is generally desirable to employ a biasing configuration for transistor Q2 which reduces the sensitivity thereof since the tuned circuit associated with pot core T2 is employed to detect the A1 column pulse. Therefore, since buttons on a DTMF pad associated with the A1 column pulse are frequently employed in normal usage of a telephone instrument connected to the line without a desire to actuate a hold circuit and also may be accidentally depressed, a reduced sensitivity for transistor Q2 is generally desirable. This is not true for the 941 Hz signal detected by the tuned circuit associated with the T1 pot core as the fourth row of a DTMF pad is associated only with the star, zero and pound buttons.

Thus, it will be appreciated that whenever a user of a telephone handset actuates the star button on a DTMF pad, a well-defined pulse will be supplied into the base of each of the transistors Q1 and Q2. This will render each of transistors Q1 and Q2 conductive to enable a path from the conductor 8 through the collector emitter pads of the transistors Q1 and Q2 to the junction point 12.

The junction point 12 is connected through a resistor R3 to the base of transistor Q4 and through the capacitor C7 to conductor 9. The capacitor C7 provides an AC bypass for the circuit and, as such, may have a typical value of 0.005 $\mu f$ while the resistor R3 acts to receive the output from the transistors Q1 and Q2, and hence, bias the transistor Q4 to conduction whenever the transistors Q1 and Q2 are gated on. Additionally, as shall be seen below, the resistor R3, in combination with a capacitor C5, form an RC timing network which, in essence, passes transient signals to the circuit common connected to the conductor 9 to avoid spurious energization of the hold latch 4.

More particularly, the resistor R3 is connected through the conductors 14-16 to the base of the transistor Q4 within the hold latch 4. The transistor Q4, as illustrated, is an NPN device which may typically take the form of a 2NA92, 250 volt device which is available from National Semiconductor Corporation. The collector of the transistor Q4 is connected through the resistor R7 and the conductor 17 to the base of transistor Q3 and through the resistor R5 to the plus side of the circuit on the conductor 8. Each of the resistors R5 and R7 serve in the roles of biasing resistors, and for this purpose, may each have a value of approximately 22 K ohms.

The emitter of the transistor Q4 is connected through the conductor 18 to a switch S1 and to the circuit common on conductor 9, as well as through conductor 19 to the parallel combination of the resistor R8 and the light-emitting diode 21. The resistor R8 serves in a biasing role when the hold latch 4 is not actuated and may have a typical value of approximately 3.3 K ohms, while the LED device serves, when the hold latch 4 is active, to indicate a hold condition and may take the form of an MV-5953 LED device.

The parallel combination of the resistor R8 and the LED device 21 are connected through the conductor 23 and a load resistor R4 to the collector of the transistor Q3 and through a biasing resistor R6 and conductor 16 to the emitter of the transistor Q4. The load resistor R4 is employed when the hold latch 4 is active as an impedance placed across tip and ring, as represented by the conductors 8 and 9 to thus seize the line. For this reason, resistor R4 may typically take the form of a 1 K ohm, 1 watt resistor although any value in the range of 220 ohms to 1200 ohms may be employed for purposes of seizing the line. The resistor R6 is a biasing resistor for the base of the transistor Q4 and may thus have a value of typically 100 K ohms.

The transistor Q3 is a conventional PNP device and mag take the form, for instance, of a 2NA42 transistor such as is available from National Semiconductor or the like. The emitter of the transistor Q3 is connected, as indicated, directly to the positive side of the circuit as present on conductor 8, while the collector thereof is connected to the voltage divider formed by the biasing resistor R6 and the load resistor R4.

The hold latch g thus principally formed by the transistors Q3 and Q4, as will now be readily appreciated by those of ordinary skill in the art, is normally in an off condition where both transistors Q3 and Q4 are off. However, whenever a hold actuating signal is detected, the positive voltage on conductor 8 will be applied through the resistor R3 and conductors 14-16 to the base of transistor Q4 to enable transistor Q4. When this occurs, current flow from conductor 8 through biasing resistors R5 and R7 will place the transistor Q3 in an on condition. When transistor Q3 conducts, current applied through the voltage divider formed by the load resistor R4 and the biasing resistor R6, will maintain the transistor Q4 in an on state.

In addition, the path provided from the conductor 8 through the emitter collector path of transistor Q3, load resistor R4 and the LED device 21 to the circuit common connected to conductor 9 will seize the line by placing the load resistor R4 between tip and ring to establish a hold condition. Thus, once a hold signal has been detected and transistors Q1 and Q2 are placed in an on condition in response thereto, transistor Q4 will be gated on and this will turn on transistor Q3 which acts in the dual role to seize the line while maintaining transistor Q4 in an on condition. Accordingly, once transistors Q3 and Q4 are enabled, the hold latch circuit 2 is self-maintaining and load resistor Q4 remains across tip and ring when transistors Q1 and Q2 subsequently turn off upon termination of the hold actuating signal.

It should be noted, however, that the hold actuating signal must persist for a sufficient interval to exceed the RC time constant established by the resistor R3 and the capacitor C5 as transistors Q1 and Q2 will remain on only so long as this signal is present. The time constant established by the resistor R3 and the capacitor C5 is typically of the order of approximately 50 ms and, for this reason, the value of capacitor C5 may be 2.2 $\mu f$. Those of ordinary skill in the art will appreciate that the function of the RC timing circuit formed by the resistor R3 and C5 is to prevent actuation of the hold latch 4 through the turning on of transistor Q4 in response to long and short transients which may occur from time to time. Hence, the timing circuit formed by the resistor R3 and the capacitor C5 act to insure that, in fact, the current applied through the resistor R3 is in response to a deliberate depression of the star button rather than an accidental touching thereof or other transient responses which might result in a signal of relatively short duration being applied through the resistor R3.

It will also be recognized that the initiation of a hold condition occurs in response to a depression of the star key or the like when a telephone instrument connected to the telephone line is in an off condition. This means that initially, when transistors Q3 and Q4 are gated on, the voltage across tip and ring or conductors g and 9 will vary from approximately 5 to 12 volts. Thereafter, the handset will be replaced on-hook at the telephone instrument whereupon tip and ring voltage conditions will attempt to resume the on-hook condition of approximately Q4 volts. However, since under these conditions, the load resistor R4 will be connected between tip and ring, the voltage between the conductors 8 and 9 once the handset is replaced to an on-hook condition will typically reside at a level between 18 and 30 volts.

Should it be desired to ensure that no more than a predetermined level is applied across the load resistor R4 when the hold circuit is actuated, a zener diode, not illustrated, may be connected across the load resistor R4. The zener should have a breakdown voltage corresponding to the voltage sought to be applied across the circuit.

The disconnect latch 6 serves to release a hold condition which has been established when the handset of a telephone instrument connected to the telephone line is lifted to place the telephone line in an off-hook condition. Then a hold condition has been established, transistors Q3 and Q4 are on and the voltage level at the collector of transistor Q3 will be within the range of 18 to 30 volts when all of the telephone instruments connected to the telephone line are in an on-hook condition. However, when one handset is lifted for purposes of releasing the hold condition, this voltage level will drop to a range of from 5 to 12 volts. This signal should release the hold condition; however, the disconnect latch 6 should not release in response to the presence of a "call waiting" signal for telephone lines having this service. The "call waiting" signal corresponds to a dip in the voltage on the conductor 8 to 0 volts and persists for an interval of approximately 200 ms.

The collector of the transistor Q3 is connected to the disconnect latch 6 and, more particularly, is connected through the diode D5 to the capacitor C8. The diode D5 may typically take the form of a 1N4148 device such as is available from International Rectifier. The function of the capacitor is to charge to a voltage level corresponding to the voltage level of the collector of the transistor Q3 and go retain such charge until it is usable by the remaining portions of the disconnect latch 6, i.e., at such time as it has been determined that a drop in the line voltage has occurred in response to a legitimate off-hook condition rather than a call waiting signal. The value of the capacitor C8 by way of example may be 50 μf and the same should be provided with a voltage rating corresponding to the maximum voltage level present at the collector Q3. Thus, a 50 volt rating would be appropriate if no zener diode were present; however, if a zener was employed in the manner described above, a voltage rating slightly greater than the breakdown voltage of the zener would be appropriate.

Then a hold condition is established by an operator at a telephone instrument in an off-hook condition depressing the star button at the DTMF pad, the capacitor C8 will initially charge to the level of the collector of transistor Q3 which will be approximately 5 to 12 volts. Once the handset of the telephone instrument is placed in an on-hook condition in response to the establishment of a hold condition, the capacitor C8 will further charge to a level corresponding to the hold voltage established which may vary, as aforesaid, from approximately 18 volts to 30 volts. Thus, once a hold condition has been signalled and a handset replaced to an on-hook condition, the capacitor C8 will charge to and maintain a charge level at the cathode of the diode D5 which corresponds substantially to the value of the voltage at the collector of the transistor Q3, as established at the junction of the resistors R4 and R6.

The disconnect latch 6 also includes the transistors Q5-Q7 which act, as shall be seen below to respond to a signal that a hold condition is to be released to turn off transistor Q4, and hence, release the load resistor R4 established across the line by the hold latch 4. The signal that the hold condition is to be released corresponds to a removal of the handset from any telephone instrument connected to the telephone line so as to place the same in an off-hook condition causing the voltage between tip and ring or that residing between conductors 8 and 9 to assume a value of from 5 to 12 volts. This condition is distinguished by the disconnect latch 6 from a condition where a call waiting signal is applied to the line and the voltage between tip and ring, as manifested by a click in an operated handset, drops to 0 volts for an interval of approximately 200 ms.

More particularly, the emitter of the transistor Q6 is connected to the cathode of the diode D5 and the capacitor C8 through the conductor 25, while the base is connected through resistor R12 to the collector of transistor Q3 and the anode of the diode D5. The resistor R12 functions as a biasing resistor for the base of the transistor Q6 and, as such, may have a typical value of approximately 22 K ohms. Under these conditions, a positive bias will be maintained on the base of The transistor Q6 when the transistor Q3 is conducting and acting to charge the capacitor C8 which is similar in magnitude to the potential at the emitter thereof.

Thus, transistor Q6 is cutoff when the hold condition is initially established and transistors Q3 and Q4 are first driven into conduction. Transistor Q6 will also be maintained in a cutoff condition when the telephone instrument is placed in an on-hook condition, even though the voltage across tip and ring as present on conductors 8 and 9 starts at a value of from 5 to 12 volts when the hold condition is established under off-hook conditions and thereafter rises to a value of from 18 to 30 volts in response to the on-hook condition. When, however, a handset of a telephone instrument connected to the line is placed in an off-hook condition to signal a release of the hold condition, the presence of the fully charged capacitor C8 will cause the base of transistor Q6 to be negative with respect to the emitter thereof, and hence, place the transistor Q6 into a conductive state.

The collector of the transistor Q6 is connected through the conductor 26 to the emitter of the transistor Q7, the biasing resistor R13 and a capacitor C9. Both transistors Q6 and Q7 may take the form, for instance, of 2N3702 devices available from National Semiconductor. The biasing resistor R13 is connected to the base of the transistor Q7 and through a second biasing resistor R14 to the conductor 14, while the capacitor C9 is connected to the base of the transistor Q7 and through a resistor R15 to the junction 28. The biasing resistor R13 may have a typical value of 22 K ohms, while the biasing resistor R14 may have a value of 100 K ohms. The capacitor C9 is employed to form an RC timing network whose value will vary as a function of the setting of the switch S1. The value of the capacitor C9 may typically be 300 μf and have at least a 3 volt rating, while the value of the resistor R15 may be approximately 1 K ohm.

The resistor R15 is connected through junction 28 to a resistor R18 and the terminal of the switch S1 annotated "no call waiting". The switch S1 has a second terminal which is shown in the active position annotated "call waiting". The value of the resistor R18 may be approximately 100 K ohms or large with respect to the value of the resistor R15. Accordingly, when the switch S1 is in the position shown, as appropriate for connection to a telephone line provided with a call waiting option, the timing interval performed by the RC network will be determined by the value of The capacitor C9 and the combined values of the resistors R15 and R18 where the value of the resistor R18 forms the majority of the resistance. Under these circumstances, those of ordinary skill in the art will appreciate that a timing circuit having a value of approximately 400 ms is present.

When the switch S1 is connected to The terminal annotated "no call waiting", a direct path is provided through the switch Q1 from the junction 28 to the circuit common connected to conductor 9. Under these circumstances, a 4 ms timing interval will be determined by the value of the capacitor C9 and the resistor R15. Thus, it will be appreciated that with the switch S1 in the position illustrated, the timing interval associated with the RC network formed by the capacitor C9 and the resistors R15 and R18 will be 400 ms, as compared to a 200 ms call waiting signal. However, when the switch S1 is in a position where the "no call waiting" terminal is active, the timing interval associated with the capacitor C9 and the resistor R15 will be g ms. and hence, relatively short. This connection is provided for use in connection with telephone lines not having a "call waiting" option.

The transistor Q7, whose emitter is connected to the collector of transistor Q6, will be cutoff as long as transistor Q6 is cutoff. However, upon the conduction of the transistor Q6, capacitor C9 will begin to charge at a rate determined by the RC time constant of the circuit formed by the capacitor C9 and either the resistor R15 or the combination of the resistors R15 and R18. Until charging is completed, the capacitor C9 will act essentially as a short circuit between base and emitter to retain the transistor Q7 in a cutoff mode. However, once the capacitor C9 has charged, the base of transistor Q7 will become negative with respect to the emitter thereof and conduction will occur.

The collector of the transistor Q7 is connected through the resistor R16 to the base of the transistor Q5 and through resistor R17 to the circuit common. The resistors R16 and R17 act as biasing resistors and may have typical values of 10 K ohms and 47 K ohms, respectively. The emitter of the transistor Q5 is connected through conductor 30 to the circuit common on conductor 9, while the collector thereof is connected through conductor 31 to the conductor 14. The transistor Q5 may take the form of an NPN device such as a 2N3704 semiconductor device as available from National Semiconductor.

Those of ordinary skill in the art will appreciate that under the conditions established, the transistor Q5 will be cutoff until such time as the transistor Q7 conducts. At that time, the base of transistor Q5 will be driven positive to cause the same to conduct. When the transistor Q5 conducts, the base of transistor Q4, as connected thereto through conductors 14–16 and conductor 31, will be pulled negative whereupon transistor Q4 will be driven into cutoff. This, in effect, will release the hold latch 4 to remove the impedance R4 from across the telephone line.

It will thus be seen that once a hold condition is initiated and the hold latch is set via the conduction of transistors Q3 and Q4, the capacitor C8 will be charged to a level essentially corresponding to the voltage on the conductor 8. When the hold condition is initially established, at least one telephone instrument connected to the line will be in an off-hook condition, and hence, capacitor C8 will only charge to a level corresponding go the off-hook condition of the telephone line which will reside at a value of from 5 to 12 volts. However, once the handset is replaced to the cradle, the capacitor C8 will charge to the voltage level associated with the hold circuit which will typically reside at from 18 to 30 volts. The value of capacitor C8 is deliberately selected so that a charge is maintained thereon for an interval which substantially exceeds the 400 ms timing interval of the RC timing circuit established by the capacitor C9 and resistors R15 and R18 to ensure that the conduction of transistor Q6 is maintained until such time as transistors Q5 and Q7 conduct. Thereafter, the conduction of the transistor Q5 releases the hold latch 4 by rendering transistor Q4 non-conductive and subsequently, as the charge on capacitor C8 dissipates, the disconnect latch 6 is deenergized when the transistor Q6 is rendered non-conductive. At this juncture, the entire hold circuit illustrated in the figure is shut down.

In operation of the embodiment of the invention illustrated in the figure, it will be appreciated that a prospective user will set the switch S1 to the appropriate terminal, depending upon whether or not a "call waiting" function is provided on the telephone line to which the instant invention is to be connected. Thereafter, the embodiment of the invention illustrated in the figure, which is preferably configured as a plug-in module, will be plugged into a conventional RJ11C jack provided in the home or office as part of the standard installation. Under circumstances where all available jacks are occupied by telephone instruments, the prospective user would acquire a two-for-one jack adapter and insert this adapter into an existing jack whereupon the embodiment of the invention illustrated in the figure would be plugged into one jack thereof, while the telephone instrument originally utilized therewith would be plugged into the second connection thereof. This completes installation of the exemplary embodiment of the hold circuit, according to the instant invention.

The instant description, as well as the exemplary embodiment set forth, assumes a DTMF telephone service is provided at the user's site. However, those of ordinary skill in the art will readily appreciate that the concepts employed within the instant invention are applicable to rotary dialing installations whereupon hook flashing or dialing of a predetermined digit may be employed as an actuating signal and the detection circuitry therefor would be modified in accordance with the teachings contained in my U.S. Pat. No. 4,243,844.

Once the embodiment of the invention illustrated in the figure is installed, all functions of the telephone system in which the device has been installed will remain the same as before with the single exception that a hold function is now available. This hold function may be implemented from any telephone instrument connected to the telephone line simply by depressing the star button at The pad when the telephone instrument is in an off-hook condition, and subsequently hanging up the handset in the normal manner. Thereafter, the hold condition may be released at that telephone instrument or any other telephone instrument connected to the telephone line merely by lifting the handset to place the system in an off-hook condition.

Once the hold circuit according to the instant invention has been installed, normal voltages between ring and tip associated with off-hook and on-hook conditions will exist across the conductors 8 and 9 except for a somewhat reduced voltage condition when the hold circuit is actuated. These voltages will have the polarities shown in the figure due to the function of the bridge circuit formed by the diodes D1–D4. Thus, if it is assumed that a positive voltage is applied to the upper one of the connected terminals within the RJ11C connector indicated at 7, a positive voltage will be applied to conductor 8 through the diode D1, while negative voltage is applied from the other connected terminal within the connector 7 through the diode D4. Should the voltages be reversed, positive voltages will still be applied to the conductor 8 through the diode D2, while negative voltages are applied to the conductor 9 through the diode D3.

Thus, when the hold circuit is inoperative, the ring to tip voltage across conductors 8 and 9, when all telephone instruments connected to the telephone line are in an on-hook condition will, under optimum conditions, have a value of approximately 48 volts. However, substantially reduced voltages may be present under circumstances where the voltage output by the central office is reduced or the telephone installation is at a great distance from the central office. An off-hook voltage condition as manifested across the conductors 8 and 9 will generally vary from 5 to 12 volts.

If it is assumed that a telephone at the site is being used and a user is desirous of placing the same on hold, such user will simply depress the star button at the DTMF pad at the telephone instrument being utilized. Thereafter, the handset is replaced in the cradle to establish an on-hook condition for the system in the traditional mode. While the exemplary circuit described in connection with the figure employs a hold signal detect circuit 2 for detecting the row and column tones associated with the star button, those of ordinary skill in the art will readily appreciate that any key on the DTMF pad could be used as well. However, the star or pound keys are preferred as fewer other functions are associated therewith.

When the star key is depressed at the DTMF pad at the telephone instrument being employed, the A1 column tone of 1209 Hz and the Q4 row tone of 941 Hz are generated at the DTMF pad at the telephone instrument in a manner well known to those of ordinary skill in the art. This tone pair is thus applied to the telephone line to which such telephone instrument is connected. These row and column frequencies will be applied from the telephone line through the connector 7, the conductor 5, the filter capacitors C1 and C2 and the primaries of pot cores T1 and T2 to the hold signal detect circuit 2. In response to the receipt of the 941 Hz tone, a well-defined pulse will be generated by the tuned circuit formed by the secondary of pot core T1 and the capacitor C3 and applied through the resistor R1 to the base of the transistor Q1. Similarly, in response to the presence of the 1209 Hz tone, the tuned circuit formed by the secondary of pot core T2 and capacitor C4 will generate a well-defined pulse which is applied through the voltage divider formed by the resistors R2 and R20 to the base of the transistor Q2.

At this juncture, at least one telephone instrument connected across tip and ring will be in an off-hook condition so that a voltage level of from 5 to 12 volts is available on the conductor 8. Therefore, upon detection of the 941 Hz row tone and the 1209 Hz column tone, transistors Q1 and Q2 will be placed in a conductive state for the duration of the tone. This will cause an output pulse to be applied to the resistor R3.

The capacitor C5 has a value in combination with the resistor R3 so that approximately a 50 ms charging interval is established. This means, as will be readily appreciated by those of ordinary skill in the art, that the capacitor C5 will represent a short to the circuit common on conductor 9 until such time as the capacitor C5 has been charged at the expiration of the 50 ms timing interval. Thus, spurious gating on of Q1 and Q2 not exceeding the time constant does not act to trigger transistor Q4.

However, as it is assumed that the star button was depressed as a result of a desire to actuate the hold circuit, the signal output by the transistors Q1 and Q2 will exceed the 50 ms window for transients established by the timing circuit formed by the resistor R3 and the capacitor C5. Once this interval is exceeded, the capacitor C5 becomes a high impedance to the output of the transistors Q1 and Q2, and hence, this output signal is applied through resistor R3 to the base of the transistor Q4 to thus drive the transistor Q4 into conduction.

Then the transistor Q4 conducts, the base of transistor Q3 is rendered negative with respect to the emitter thereof due to the positive level on the conductor 8 and the presence of base biasing resistors R5 and R7. Thus, transistor Q3 will conduct and maintain the transistor Q4 in a conductive condition even though the original output of transistors Q1 and Q2 terminates. Transistors Q3 and Q4 thus form a regenerative or latching circuit which is self-maintaining until such time as the transistor Q4 is rendered non-conductive. The output of the transistor Q3, as present at the collector thereof, is applied to the voltage divider formed by the resistor R6 and the load resistor Q4 so that not only is the transistor Q4 maintained in a conductive condition, but also the load resistor R4 and the LED 21 are established across tip and ring. In this regard, it should be noted that the LED device 21 exhibits a very low impedance in the forward direction when the same is conducting and only drops approximately 1.7 volts thereacross.

The function of the resistor R8 is to maintain a substantial impedance to ground when the hold latch 4 is inoperative; however, when the LED device 21 is illuminated by the actuation of the transistors Q3 and Q4, a very small resulting impedance is represented by the parallel combination of the actuated LED device 21 and the resistor R8. Thus, for all practical purposes, the 1 K ohm load resistor R4 is all that is placed between tip and ring when the hold circuit is actuated and the LED device 21 is illuminated to indicate this condition.

Since the hold circuit illustrated in the figure has been accessed, the user would typically replace the handset to the cradle to reestablish all telephone instruments connected to the telephone line in an on-hook condition. It should be noted, however, that the user may still converse through the handset if it is not returned to the cradle as a dropping of the 1 K ohm load resistor R4 across tip and ring will not prevent communications, even though some attenuation will occur.

As the hold latch 4 is actuated, part of the output of the transistor Q3, as present at the collector thereof, will be applied through the diode D5 to the capacitor C8 to begin the charging thereof. If the handset is still in use, only a 5 to 12 volt level of voltage will exist between tip and ring and be available for purposes of charging the capacitor C8. Once, however, the handset is replaced on the cradle and on-hook conditions are established for all telephones connected to the telephone line, the capacitor C8 will be fully charged to a value of from 18 to 30 volts. Thus, once the telephone handset is replaced to the cradle, the value on capacitor C8 will build to a level corresponding to the voltage drop across the hold circuit which may here be assumed to be 18 volts. The hold condition established wherein the load resistor R4 is placed across tip and ring and transistors Q3 and Q4 maintain one another in conduction is maintained until such time as the hold condition is removed by a user lifting the handset of a telephone instrument connected to the line.

If the exemplary embodiment of the hold circuit is connected to a telephone line having call waiting service, the switch S1 will be set to the position illustrated in the figure. Furthermore, it will be appreciated that any time the site is called when the telephone line is otherwise employed, the site will manifest a busy condition, and hence, a call waiting pulse will be applied to the line. The call waiting pulse, as aforesaid, typically takes the form of a 0 voltage pulse having a duration of approximately 200 ms to the line.

When a "call waiting" signal occurs, those of ordinary skill in the art will appreciate that the voltage level on conductor g will go to Q and no further charging current will be applied through the diode D5 to the capacitor C8. Under these circumstances, the base of transistor Q6 will be sharply negative with respect to the emitter thereof, as the emitter connected to conductor 25 resides at the voltage level acquired through a charging of capacitor C8 while the base of the transistor Q6 will reside at 0 volts. Thus, transistor Q6 is gated into conduction and the output of transistor Q6 on the conductor 26 will be applied to the resistor R13 and the capacitor C9. However, as the capacitor C9 has not yet charged, the same will represent a short circuit and for all practical purposes the base of the transistor Q7 will reside at the same voltage as the emitter thereof so that transistor Q7 is maintained in a non-conductive state.

When the switch S1 is set in the condition illustrated in the figure, the time constant for the RC circuit is determined by the values of the capacitor C9 and the resistors R15 and R18. Since the value of the resistor R18 is large to establish a time constant of approximately 400 ms, capacitor C9 will not fully charge during the 200 ms interval associated with a call waiting pulse. Thus, as the call waiting pulse will terminate at the end of 200 ms, the conduction of transistor Q6 terminates prior to the conduction of transistor Q7 when a call waiting pulse is applied to the telephone line and neither the transistors Q7 nor Q5 are rendered conductive. Accordingly, the conduction of the transistor Q6 initiated by the leading edge of the call waiting pulse will terminate at the end of the 200 ms interval associated with the call waiting pulse without anything else occurring. Upon termination of the call waiting pulse, the conduction of the transistor Q6 will be extinguished, the 18 to 20 volt level on conductor g will be reestablished and the charging of capacitor C8 will be continued, as was the case when the hold condition was initiated. This means, as will be readily appreciated by those of ordinary skill in the art, that with the switch S1 set in the position illustrated, call waiting signals will be effectively ignored by the hold circuit illustrated in the figure.

When a user decides to terminate the hold condition, the handset of any telephone instrument connected to the telephone line may be utilized to implement this result. More particularly, the user need only remove the handset of any telephone instrument connected to the line from its cradle to establish an off-hook condition. This off-hook condition will cause the voltage level on the telephone line to drop to a value of from 5 to 12 volts, as aforesaid. When the voltage on the conductor g drops to a value from between 5 to 12 volts, the charging of capacitor C8 through diode D5 will again terminate and transistor Q6 will again be rendered conductive since the base thereof connected to resistor R12 will be negative with respect to the emitter which receives the voltage of the capacitor C8 through the conductor 25. Thus, the transistor Q6 is again rendered conductive and its output is again applied through the conductor 26 to the resistor R13 and the capacitor C9. Under these circumstances, and as was described above, the capacitor C9 will represent effectively a short so that the base of the transistor Q7 will reside at essentially the same voltage as its emitter until such time as the capacitor C9 has become fully charged. This will take approximately 400 ms due to the time constant associated with the circuit formed by the capacitor C9 and the resistors R15 and R18; however, it should be noted that the user may immediately communicate even though some attenuation will be present on the line.

At the termination of the 400 ms interval associated with the time constant established, the capacitor C9 will be fully charged whereupon the base of the transistor Q7 will be rendered negative with respect to the emitter thereof and the transistor Q7 will be driven into conduction. It should be noted that the transistor Q6 remains conductive as the off-hook condition established by the user will retain the base of the transistor Q6 negative with respect to the emitter thereof which is connected to the capacitor C8 since the capacitor C8 will not significantly discharge during this interval.

Upon conduction of the transistor Q7, the output thereof is supplied through the resistor R16 to the base of transistor Q5. Transistor Q5, in turn, is rendered conductive which effectively connects the base of transistor Q4 through conductors R14-R16 to the circuit common connected to the conductor 9. The transistor Q4 is thus driven out of conduction which, in turn, terminates the conduction of the transistor Q3. This releases the hold latch 4 causing LED device 21 to be extinguished and load resistor R4 to be removed from across conductors 8 and 9. Subsequently, when the capacitor C8 completes its discharge through the transistors Q6, Q7 and the resistors R16 and R17, transistor Q6 is rendered non-conductive which, in turn, renders transistors Q7 and Q5 non-conductive. Thus, it will be appreciated that once the hold latch 4 is disabled, the disconnect latch 6 turns itself off. Hence, the embodiment of the invention illustrated in the figure is returned to a quiescent state and awaits the receipt of a new hold access signal as generated by the depression of the star key.

Those of ordinary skill in the art will appreciate that when the switch S1 is set to the position indicated by the terminal annotated "no call waiting", the resistor R18 will be effectively removed from the RC timing circuit associated with the capacitor C9. This means that the time constant will now be determined by the value of the capacitor C9 and the resistor R15 which, as aforesaid, results in a time constant of approximately 4 ms which is appropriate for telephone lines not having a "call waiting" service. Under these circumstances, release of the hold circuit by an operator placing any telephone instrument connected to the line in an off-hook condition will occur in precisely the same manner described above. However, since the capacitor C9 will fully charge within a 4 ms interval, release of the hold latch 4 will occur in a much more rapid manner. The shutdown of the disconnect latch will occur in the same manner described above.

It will thus be seen that the instant invention provides improved hold circuits for telephone systems for establishing and releasing a hold condition on a telephone line and for maintaining an enabled hold condition despite an application to the telephone line of a transitory signal condition having certain characteristics in common with a release signal. In addition, the improved hold circuits, according to the present invention, do not require separate power supplies but, instead, may be independently powered by voltage levels present on the telephone line to which the improved hold circuits are connected. The improved hold circuits provided in accordance with the teachings of the present invention are fully operable for establishing and releasing a hold condition on the telephone line in response to conditions initiated at a telephone instrument, regardless of whether or not "call waiting" service is provided, and such improved hold circuits are readily switchable to accommodate the presence or absence of such "call waiting" service.

Although the present invention has been disclosed in conjunction with a specific preferred embodiment thereof, various alternatives and modifications to the specific structure set forth herein will be obvious to those of ordinary skill in the art. For instance, while specified exemplary values for circuit components have been set forth, other components having different values and different parameters may be substituted by those of ordinary skill in the art as a matter of design choice. Furthermore, while the instant invention has been disclosed in association with circuitry employing discrete components, integrated circuits could be used as well. In addition, those of ordinary skill in the art will readily appreciate that rather than employing individual logic and circuits, microprocessor switching and frequency detection techniques could be substituted for the techniques illustrated in the exemplary embodiment to achieve a marked reduction in the number of components employed, as well as for increasing the response time in which circuit functions are performed.

It is also contemplated that the invention be incorporated as an integral component of a telephone instrument to provide the hold and release function of the invention as described.

While the invention has been described in connection with an exemplary embodiment thereof, it will be understood that many modifications will be readily apparent to those of ordinary skill in the art and that this application is intended to cover any adaptation or variations thereof. Therefore, it is manifestly intended that this invention be only limited by the claims and the equivalents thereof.

What is claimed is:

1. Hold circuit apparatus comprising:
   means for connecting to a telephone line having at least one telephone instrument connected thereto;
   means for detecting the presence of hold actuating signal information applied to said telephone line from a telephone instrument in an off-hook condition connected to said telephone line and received from said telephone line by said means for connecting;
   means responsive to a detection of hold actuating signal information on said telephone line for placing an impedance across said telephone line to establish said telephone line in a hold mode;
   means for accumulating charge enabled whenever said hold mode has been established, said means for accumulating charge acquiring a voltage level representative of a voltage level across said impedance and said voltage level across said impedance having a first value when said hold mode is initially established and said telephone instrument is in an off-hook condition and a second value if said telephone instrument is subsequently placed in an on-hook condition;
   switch means having first and second states, said switch means being connected to said means for accumulating charge and said impedance, said switch means being responsive to said impedance having said second value of voltage thereacross and said means for accumulating charge having a voltage level representing said second value to maintain said first state and responsive to said impedance having said first value of voltage thereacross and said means for accumulating charge having a voltage level representing said second value to assume said second state;
   means connected to said switch means for timing the duration in which said switch means is in said second state and comparing said duration timed to a predetermined interval associated with a condition on said telephone line indicative of an exchange signal; and
   removing means, responsive to said timed duration of said switch means being in said second state for a period greater than said predetermined interval, for removing said impedance from across said telephone line and releasing said hold mode.

2. The hold circuit apparatus according to claim 1 wherein said means for timing and comparing comprises:
   switching means having first and second states connected to said switch removing means and to said means, said switching means normally being in said first state; and
   timer means connected to said switch means and said switching means, said timer means having a timing value greater than said predetermined interval and causing said switching means to assume said second state whenever said switch means is in said second state for a period greater than said predetermined interval.

3. The hold circuit apparatus according to claim 2 wherein said timer means includes an RC circuit having a time constant corresponding to said timing value.

4. The hold circuit apparatus according to claim 3 additionally comprising means for modifying said time constant of said RC circuit, said means for modifying having first and second positions and acting in one of said positions to markedly reduce said time constant of said RC circuit to enable prompt release of said hold mode.

5. The hold circuit apparatus according to claim g wherein said accumulating means retains a charge level thereon for a period exceeding said predetermined interval.

6. The hold circuit apparatus according to claim 1 wherein said accumulating means retains a charge level thereon for a period exceeding said predetermined interval.

7. The hold circuit apparatus according to claim 1 wherein said means for placing an impedance across said telephone line comprises latching circuit means which is self-maintaining once enabled by said means for detecting until disabled by said means for removing.

8. The hold circuit apparatus according to claim 7 wherein said latching circuit means includes transient signal bypass means for preventing said latching means from being enabled by spurious signals from said means for detecting.

9. The hold circuit apparatus according to claim 1 wherein said means for detecting includes a pair of tuned circuits, each tuned circuit being tuned to an associated one of a DTMF tone pair employed as hold actuating signal information.

10. The hold circuit apparatus according to claim 9 wherein each tuned circuit includes a pot core as an element thereof.

11. The hold circuit apparatus according go claim 2 wherein said accumulating means retains a charge level thereon for a period exceeding said predetermined interval.

12. The hold circuit apparatus according to claim 2 wherein said means for placing an impedance across said telephone line comprises latching circuit means which is self-maintaining once enabled by said means for detecting until disabled by said means for removing.

13. The hold circuit apparatus according to claim 2 wherein said means for detecting includes a pair of tuned circuits, each tuned circuit being tuned to an associated one of a DTMF tone pair employed as hold actuating signal information.

14. The hold circuit apparatus according to claim 13 wherein said accumulating means retains a charge level thereon for a period exceeding said predetermined interval.

15. The hold circuit apparatus according to claim 13 wherein said means for placing an impedance across said telephone line comprises latching circuit means which is self-maintaining once enabled by said means for detecting until disabled by said means for removing.

16. The hold circuit apparatus according to claim 12 wherein said accumulating means retains a charge level thereon for a period exceeding said predetermined interval.

17. The hold circuit apparatus according to claim 16 wherein said means for detecting includes a pair of tuned circuits, each tuned circuit being tuned to an associated one of a DTMF tone pair employed as hold actuating signal information.

18. The hold circuit apparatus according to claim 16 wherein said timer means includes an RC circuit having a time constant corresponding to said timing value.

19. The hold circuit apparatus according to claim 18 wherein said means for detecting includes a pair of tuned circuits, each tuned circuit being tuned to an associated one of a DTMF tone pair employed as hold actuating signal information.

20. The hold circuit apparatus according to claim 19 wherein said latching means includes transient signal bypass means for preventing said latching means from being enabled by spurious signals from said means for detecting.

21. The hold circuit apparatus according to claim 20 additionally comprising means for modifying said time constant of said RC circuit, said means for modifying having first and second positions and acting in one of said positions to markedly reduce said time constant of said RC circuit to enable prompt release of said hold mode when said hold circuit apparatus is not connected to a telephone line receiving predetermined exchange signals.

22. Hold circuit apparatus comprising:
    means for connecting to a telephone line having at least one telephone instrument connected thereto;
    means for detecting the presence of hold actuating signal information applied to said telephone line from a telephone instrument and received from said telephone line by said means for connecting;
    means responsive to a detection of hold actuating signal information applied to said telephone line for placing an impedance across said telephone line to maintain said telephone line in a hold mode;
    monitoring means for determining a condition on said telephone line indicative that a hold release signal may have been applied to said telephone line from a telephone instrument;
    means for selectively establishing first and second timing intervals, said second timing interval being substantially larger than said first and associated with a condition on said telephone line indicative of a signal other than a hold release signal;
    means for comparing the duration of said condition determined by said monitoring means to one of said first and second time intervals selectively established by said means for establishing; and
    means for releasing said hold mode only when said duration of said condition determined by said monitoring means exceeds a selected one of said first and second timing intervals established by said means for selectively establishing.

23. The hold circuit apparatus according to claim 22 wherein said means for comparing includes an RC circuit having a time constant corresponding to one of said first and second timing intervals and said means for selectively enabling includes switch means for changing said time constant to another of said first and second timing intervals.

24. The hold circuit apparatus according to claim 22 wherein said monitoring means comprises:
    means for storing a value representing voltage on said telephone line when said hold mode is established, said means for storing assuming a voltage level corresponding to a voltage level across said impedance and said voltage level across said impedance having a first value when said hold mode is initially established and said telephone instrument is in an off-hook condition and a second value if said telephone instrument is subsequently placed in an on-hook condition; and
    switching means having first and second states, said switching means being connected to said means for storing and said impedance.

25. The hold circuit apparatus according to Claim 24 wherein said switching means is responsive to said impedance having said second value of voltage thereacross and said means for storing having a voltage level representing said second value to maintain said first state and responsive to said impedance having said first value of voltage thereacross and said means for storing having a voltage level representing said second value to assume said second state.

26. The hold circuit apparatus according to claim 22 wherein said means for placing an impedance across said telephone line comprises latching circuit means which is self-maintaining once enabled by said means for detecting until disabled by said means for releasing.

27. The hold circuit apparatus according to claim 26 wherein said latching means includes transient signal bypass means for preventing said latching means from being enabled by spurious signals from said means for detecting.

28. The hold circuit apparatus according to claim 22 wherein said means for detecting includes a pair of tuned circuits, each tuned circuit being tuned to an associated one of a DTMF tone pair employed as hold actuating signal information.

29. The hold circuit apparatus according to claim 28 wherein each tuned circuit includes a pot core as an element thereof.

30. The hold circuit apparatus according to claim 23 wherein said monitoring means comprises:
    means for storing a value representing voltage on said telephone line when said hold mode is established, said means for storing assuming a voltage level corresponding to a voltage level across said impedance and said voltage level across said impedance having a first value when said hold mode is initially established and said telephone instrument is in an off-hook condition and a second value if said telephone instrument is subsequently placed in an on-hook condition; and
    switching means having first and second states, said switching means being connected to said means for storing and said impedance.

31. The hold circuit apparatus according to claim 23 wherein said means for placing an impedance across said telephone line comprises latching circuit means which is self-maintaining once enabled by said means for detecting until disabled by said means for releasing.

32. The hold circuit apparatus according to claim 23 wherein each tuned circuit includes a pot core as an element thereof.

33. The hold circuit apparatus according to claim 24 wherein said means for placing an impedance across said telephone line comprises latching circuit means which is self-maintaining once enabled by said means for detecting until disabled by said means for releasing.

34. The hold circuit apparatus according to claim 24 wherein each tuned circuit includes a pot core as an element thereof.

35. The hold circuit apparatus according to claim 33 wherein each tuned circuit includes a pot core as an element thereof.

36. The hold circuit apparatus according to claim 35 wherein said latching means includes transient signal bypass means for preventing said latching means from being enabled by spurious signals from said means for detecting.

37. Hold circuit apparatus comprising:
means for connecting to a telephone line having at least one telephone instrument connected thereto;
means for detecting the presence of hold actuating signal information applied to said telephone line from a telephone instrument and received from said telephone line by said means for connecting;
means responsive to a detection of hold actuating signal information on said telephone line for placing an impedance across said telephone line to maintain said telephone line in a hold condition;
monitoring means for determining a condition on said telephone line which may indicate a hold release signal has been applied to said telephone line from a telephone instrument;
means for timing the duration of said condition determined by said monitoring means and comparing said duration timed to a predetermined interval associated with a similar condition on said telephone line indicative of a signal other than a hold release signal applied to said telephone line; and
means responsive to said duration of said condition determined by said monitoring means exceeding said predetermined interval for removing said impedance from across said telephone line and releasing said hold condition and wherein said means for placing an impedance across said telephone line comprises latching circuit means which is self-maintaining once enabled by said means for detecting until disabled by said means for removing.

38. The hold apparatus according to claim 37 additionally comprising means for selectively changing said predetermined interval to a reduced interval.

39. The hold circuit apparatus according to claim 37 wherein said monitoring means comprises:
means for storing a value representing voltage on said telephone line when said hold mode is established, said means for storing assuming a voltage level corresponding to a voltage level across said impedance and said voltage level across said impedance having a first value when said hold mode is initially established and said telephone instrument is in an off-hook condition and a second value if said telephone instrument is subsequently placed in an on-hook condition; and
switching means having first and second states, said switching means being connected to said means for storing and said impedance.

40. The hold circuit apparatus according to claim 39 wherein said switching means is responsive to said impedance having said second value of voltage thereacross and said means for storing having a voltage level representing said second value to maintain said first state and responsive to said impedance having said first value of voltage thereacross and said means for storing having a voltage level representing said second value to assume said second state.

41. The hold circuit apparatus according to claim 40 wherein said means for timing and comparing comprises:
gating means having first and second states connected to said switching means and to said means for removing, said switching means normally being in said first state; and
timer means connected to said switching means and said gating means, said timer means having a timing value greater than said predetermined interval and causing said gating means to assume said second state whenever said switching means is in said second state for a period greater than said predetermined interval.

42. The hold circuit apparatus according to claim 41 wherein said timer means includes an RC circuit having a time constant corresponding to said timing value.

43. The hold circuit apparatus according to claim 42 additionally comprising switch means for modifying said time constant of said RC circuit, said switch means having first and second positions and acting in one of said positions to markedly reduce said time constant of said RC circuit to enable prompt release of said hold mode when said hold circuit apparatus is not connected to a telephone line receiving exchange signals.

44. The hold circuit apparatus according to claim 37 wherein said latching means includes transient signal bypass means for preventing said latching means from being enabled by spurious signals from said means for detecting.

45. The hold circuit apparatus according to claim 37 wherein said means for detecting modulates a pair of tuned circuits, each tuned circuit being tuned to an associated one of a DTMF tone pair employed as hold actuating signal information.

46. The hold circuit apparatus according to claim 45 wherein each tuned circuit includes a pot core as an element thereof.

47. The hold apparatus according to claim 40 additionally comprising means for selectively changing said fixed, predetermined interval to a reduced interval.

48. Hold circuit apparatus for connection to a telephone line having at least one telephone instrument connected thereto, said hold circuit apparatus comprising:
means for connecting to a telephone line and receiving signal information therefrom;
means for detecting hold actuating signal information applied to said telephone line from a telephone instrument in an off-hook condition and received from said telephone line by said means for connecting;
means responsive to a detection of hold actuating signal information on said telephone line for placing an impedance across said telephone line to maintain said telephone line in a hold condition;

means for monitoring voltage across said telephone line when said impedance is placed across said telephone line by said means responsive, said means for monitoring voltage assuming a first condition when said impedance is initially placed across said telephone line and said telephone instrument remains in an off-hook condition and subsequently assuming a second condition if said telephone instrument is placed in an on-hook condition;

means for determining a presence of a reduced voltage on said telephone line after said impedance is placed across said telephone line and providing an output signal representative thereof;

means for timing said output signal and comparing the duration of said output signal to a predetermined interval associated with a known extraneous low voltage signal condition on said telephone line and providing a gating signal when said interval is exceeded; and means responsive to said gating signal and said monitoring means being in a second condition for removing said impedance from across said telephone line and disabling said hold condition and further comprising means for selectively modifying said predetermined interval to a markedly reduced interval to enable prompt disabling of hold mode when said hold circuit apparatus is connected to a telephone line receiving exchange signals.

* * * * *